Dec. 3, 1968  W. R. WALKER  3,414,220
CLAMP MEANS
Filed Dec. 30, 1966  5 Sheets-Sheet 1
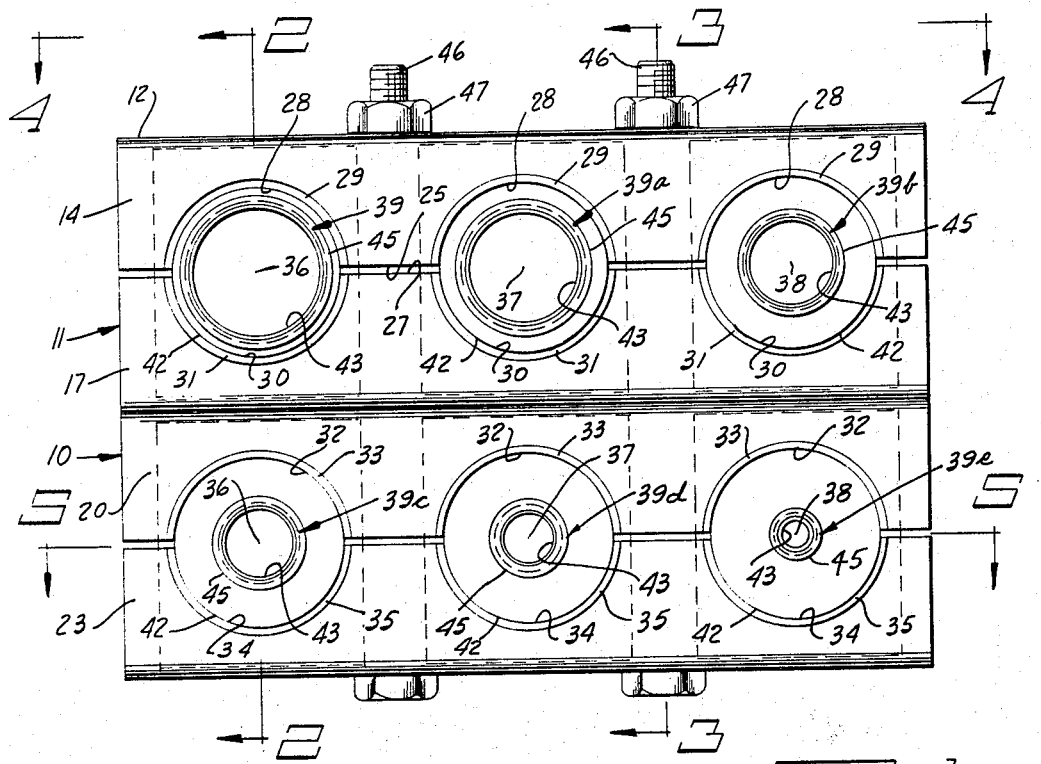
Fig. 1
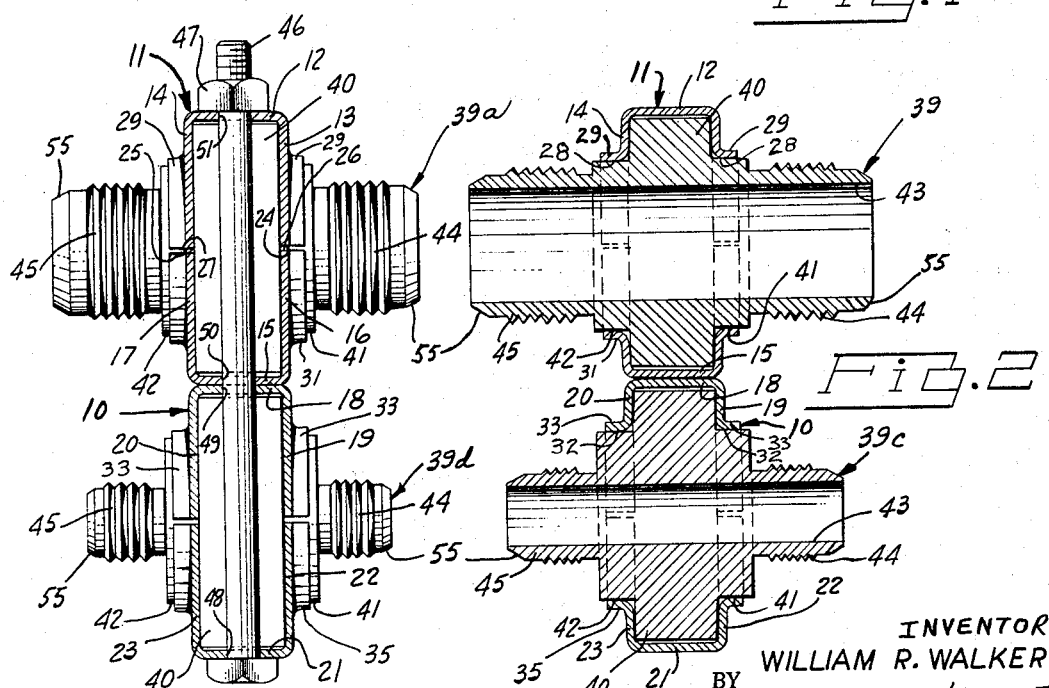
Fig. 2
Fig. 3
INVENTOR.
WILLIAM R. WALKER
BY Donnelly, Mentag & Harrington
ATTORNEYS Dec. 3, 1968  W. R. WALKER  3,414,220

CLAMP MEANS

Filed Dec. 30, 1966  5 Sheets-Sheet 2

INVENTOR.
WILLIAM R. WALKER
BY Donnelly, Mentag & Harrington
ATTORNEYS

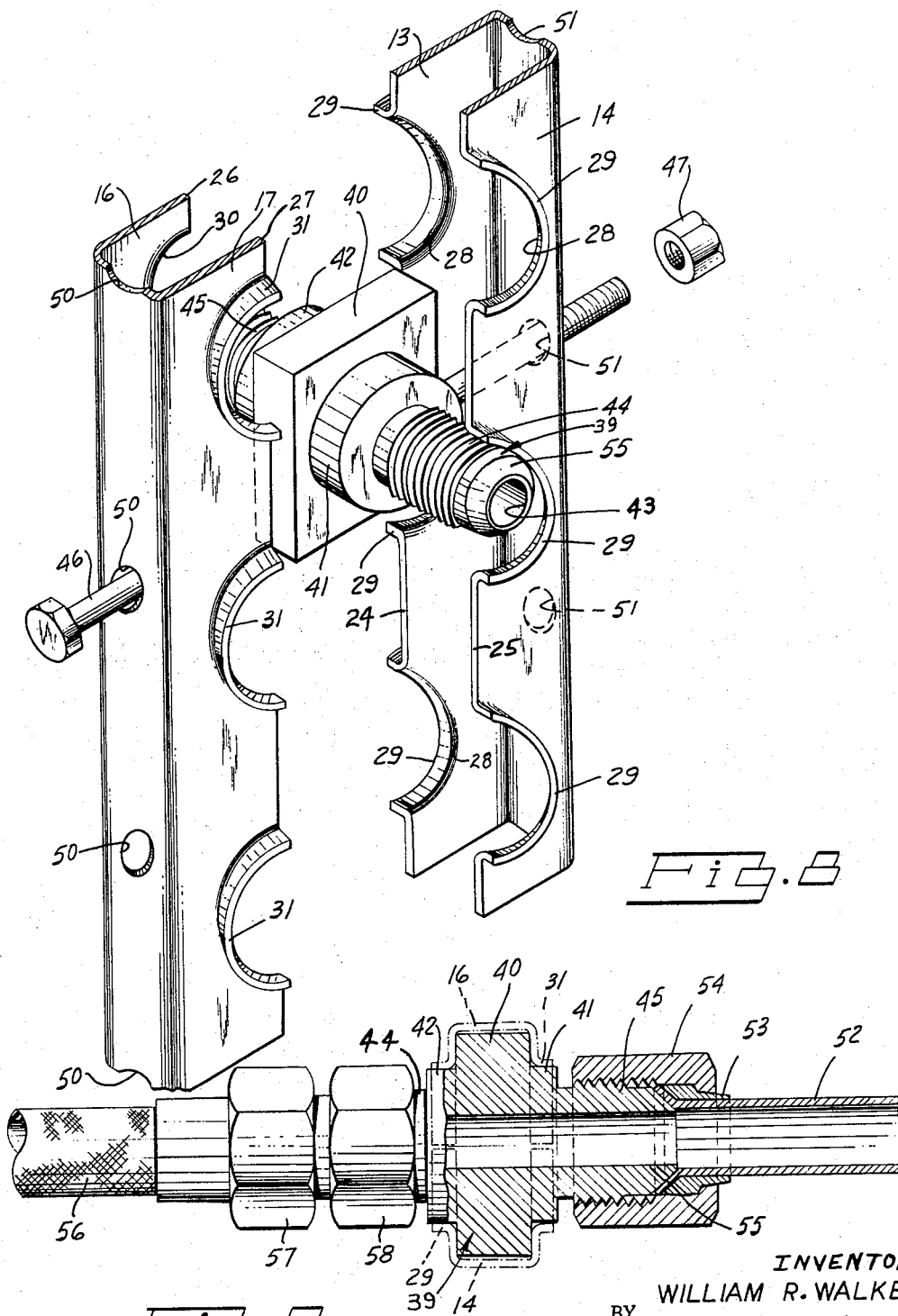

Dec. 3, 1968  W. R. WALKER  3,414,220
CLAMP MEANS
Filed Dec. 30, 1966  5 Sheets-Sheet 4

INVENTOR.
WILLIAM R. WALKER
BY Donnelly, Mentag & Hannington
ATTORNEYS

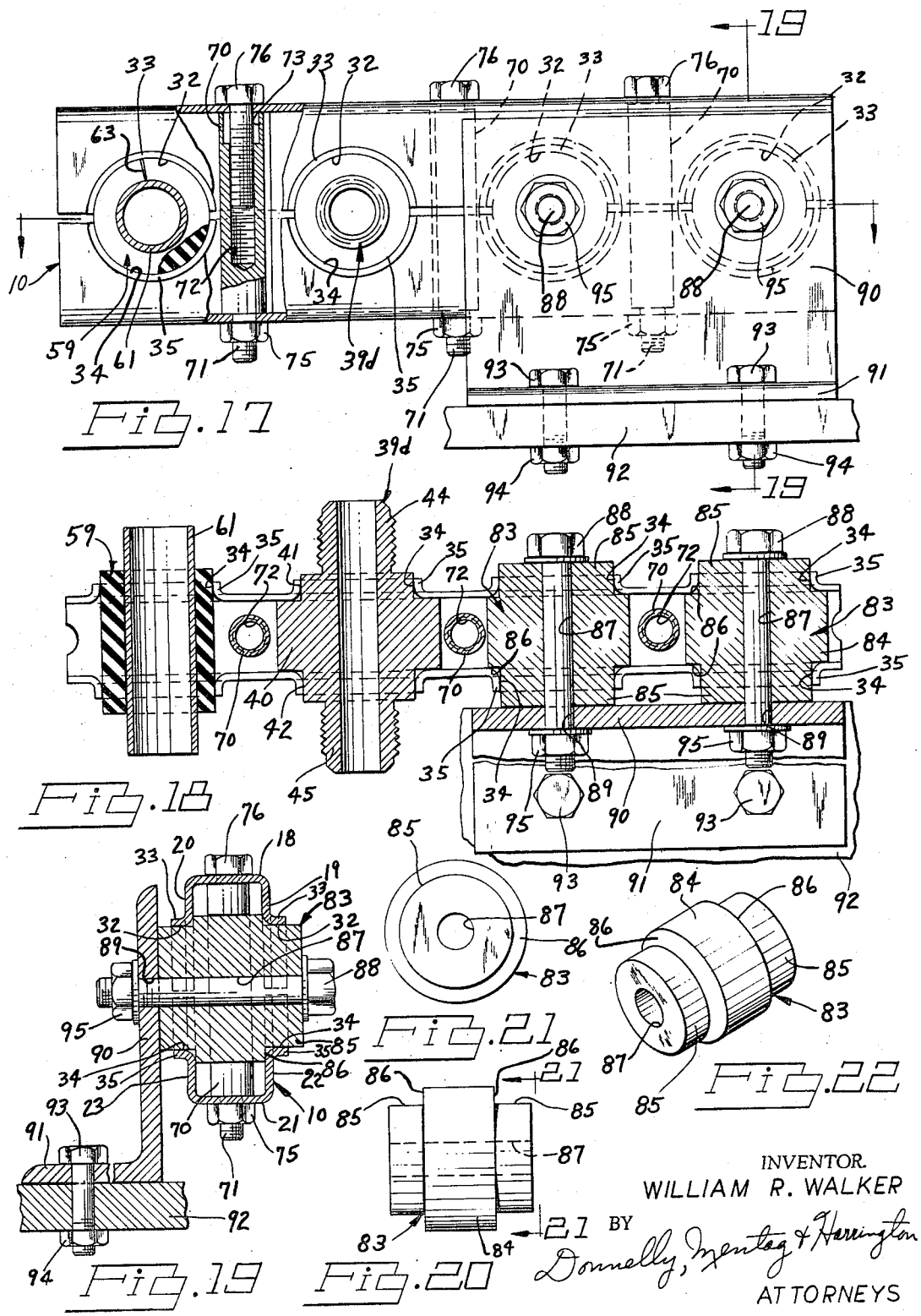

United States Patent Office 3,414,220
Patented Dec. 3, 1968

3,414,220
CLAMP MEANS
William R. Walker, Metamora, Mich., assignor to Hydro-Craft, Inc., Detroit, Mich., a corporation of Michigan
Filed Dec. 30, 1966, Ser. No. 606,411
9 Claims. (Cl. 248—68)

ABSTRACT OF THE DISCLOSURE

A clamp assembly comprising, at least a pair of aligned U-shaped elongated members disposed with one member inverted and on top of the other, each of said U-shaped members having a pair of spaced apart side walls, each of said side walls of each U-shaped member being provided with a plurality of longitudinally spaced apart semi-circular holes along the free edges thereof, the semi-circular holes in the one U-shaped member being aligned with the semi-circular holes in the other U-shaped member to form a plurality of pairs of transversely spaced circular holes, a connection fitting seated in the U-shaped members at each pair of aligned spaced apart circular holes, and means for securing the pair of U-shaped clamping members together.

---

This invention relates generally to the clamping art, and more particularly to a multiple clamp assembly adapted to support a plurality of quick disconnect fittings adapted to be used for quickly connecting or disconnecting a plurality of fluid lines.

It is an important object of the present invention to provide a novel clamp assembly which is adapted to hold a plurality of fittings of different sizes for quickly and easily connecting a plurality of fluid lines running from a power supply to a machine or the like.

It is another object of the present invention to provide a novel and improved clamp means which is adapted to be quickly and easily mounted on a machine tool for connecting a plurality of fluid supply lines to a machine tool or the like and which can be quickly and easily dismantled from the machine tool.

It is still another object of the present invention to provide a novel and improved clamp assembly that incorporates a plurality of fittings which are held in clamping sections so that they will not turn or vibrate.

It is still another object of the present invention to provide a novel clamp assembly which is adapted to hold a plurality of fittings which are interchangeable with other fittings having standard coupling features.

It is still a further object of the present invention to provide a novel clamp assembly which may function as a combination junction block and clamp for a plurality of tube fittings and hose connections.

It is still a further object to provide a clamp assembly comprising, at least a pair of aligned U-shaped elongated members disposed with one member inverted and on top of the other; each of said U-shaped members having a pair of spaced apart side walls; each of said side walls of each U-shaped member being provided with a plurality of longitudinally spaced apart, semi-circular holes along the free edges thereof; the semi-circular holes in the one U-shaped member being aligned with the semi-circular holes in the other U-shaped member to form a plurality of pairs of transversely spaced circular holes; a connection fitting, mounting adaptor, or grommet, seated in the U-shaped members at each pair of aligned spaced apart circular holes; and, means for securing the pair of U-shaped tube clamping members together; including a stud means; each of the semi-circular holes in the U-shaped members having a laterally extending flange.

It is another object of the present invention to provide a novel and improved clamp assembly which employs a pair of U-shaped elongated members adapted to be quickly and easily aligned and secured together by a novel stud.

It is a further object of the present invention to provide a novel and improved tube clamping assembly to which can be quickly and easily added additional sections to form a clamping assembly with increased clamping capacity without dismantling a previously mounted clamping assembly made in accordance with the present invention.

It is still another object of the present invention to provide a novel and improved tube clamp assembly which includes a plurality of clamping sections which may be quickly and easily stacked on each other in a minimum of time and with a minimum of labor.

It is still a further object of the present invention to provide a novel tube clamp assembly which incorporates a novel stud structure that functions to hold the sections of the clamping assembly together and to guide the sections into operative engagement with each other when they are being assembled.

It is still another object of the present invention to provide a novel tube clamp assembly which is simple and compact in construction, economical to manufacture, and efficient in operation.

It is still a further object of this invention to provide a multiple clamp assembly which includes a novel mounting adaptor means.

Other objects, features and advantages of this invention will be apparent from the following detailed description, appended claims, and the accompanying drawings.

In the drawings:

FIG. 1 is a side elevational view of a multiple clamp assembly made in accordance with the principles of the present invention;

FIG. 2 is an elevational section view of the structure illustrated in FIG. 1, taken along the line 2—2 thereof, and looking in the direction of the arrows;

FIG. 3 is an elevational section view of the structure illustrated in FIG. 1, taken along the line 3—3 thereof, and looking in the direction of the arrows;

FIG. 8 is an elevational perspective view of a portion of the multiple clamp assembly of FIG. 1, and showing the parts separated to illustrate the structure of the clamp assembly;

FIG. 9 is a fragmentary, elevational view, partly in section, of a second type of fitting employed in the invention;

FIG. 17 is a side elevational view of a multiple clamp assembly made in accordance with the principles of the present invention, and showing the clamp assembly secured to a support member by a novel mounting adaptor means;

FIG. 18 is a horizontal section view of the structure illustrated in FIG. 17, taken along the line 18—18 thereof, and looking in the direction of the arrows;

FIG. 19 is an elevational section view of the structure illustrated in FIG. 17, taken along the line 19—19 thereof, and looking in the direction of the arrows;

FIG. 20 is a side view of a mounting adaptor used in the invention;

FIG. 21 is an end view of the mounting adaptor shown in FIG. 20, taken along the line 21—21 thereof, and looking in the direction of the arrows; and, FIG. 22 is a perspective view of the mounting adaptor of FIGS. 20 and 21.

Figure 4:
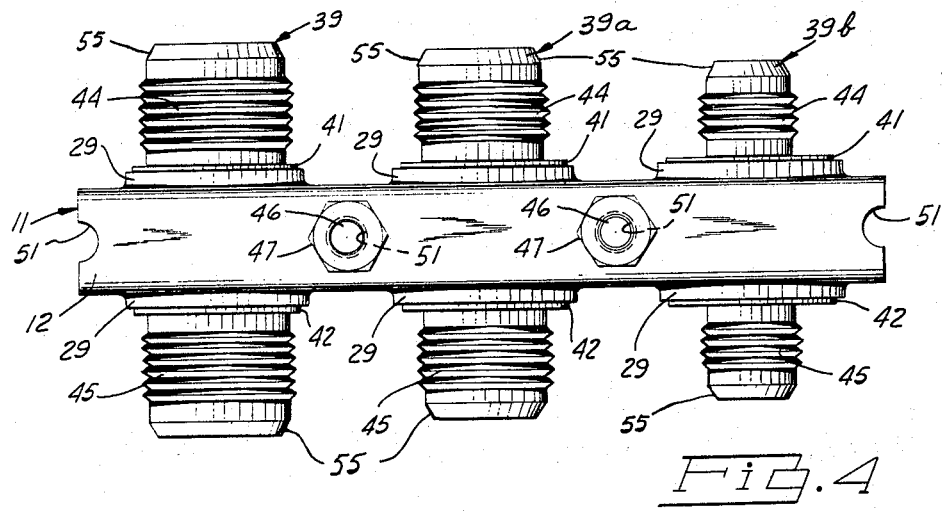
FIG. 4 is a top plan view of the structure illustrated in FIG. 1, taken along the line 4—4 thereof, and looking in the direction of the arrows.
Figure 5:
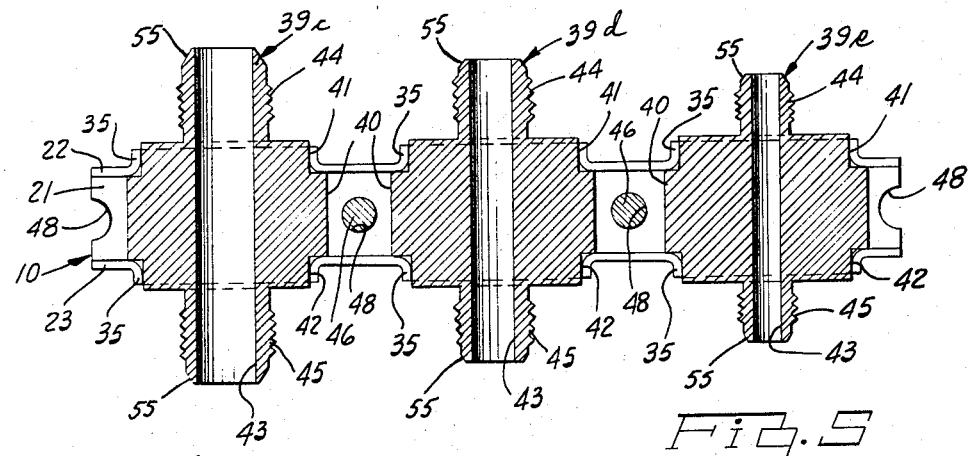
FIG. 5 is a horizontal section view of the structure illustrated in FIG. 1, taken along the line 5—5 thereof, and looking in the direction of the arrows.

Referring now to the drawings and in particular to FIGS. 1, 2 and 3, the numerals 10 and 11 generally indicate two sections of a multiple clamp assembly made in accordance with the principles of the present invention. Each of the clamp sections 10 and 11 is made from a pair of U-shaped, elongated, channel bars which are disposed with the free or open edges thereof adjacent each other so as to form a substantially rectangular, elongated tubular member.

As best seen in FIGS. 1, 2 and 3, the upper clamp section 11 includes an upper channel bar which comprises the horizontal top end wall 12 which forms the bight portion of the channel bar and the vertical integral side walls 13 and 14. The lower channel bar of the upper clamp section is similarly formed and includes the horizontal bottom end wall 15 and the vertical integral spaced apart side walls 16 and 17.

As shown in FIG. 3, the lower clamp section 10 includes an upper channel bar which comprises the top end wall 18 that is horizontal and forms the bight portion of the channel bar, and the integral vertical side walls 19 and 20. The lower channel bar of the lower clamp section 10 is formed similarly and includes the horizontal bottom end wall 21 and the vertical integral spaced apart side walls 22 and 23.

As shown in FIG. 3, the lower edges of the upper channel side walls 13 and 14 are parallel and are indicated by the numerals 24 and 25, respectively. The upper edges of the mating lower channel bar side walls 16 and 17 are indicated by the numerals 26 and 27, respectively. As best seen in FIG. 8, the channel side walls 13 and 14 are each provided along the free or lower ends thereof with a plurality of longitudinally spaced apart, inwardly extended, semi-circular or half-round holes 28. Each of the semi-circular holes 28 has a perpendicular, outwardly extended semi-circular flange or clamp seat 29. The side walls 16 and 17 on the lower channel bar of the upper clamp section are also each provided with a plurality of similarly semi-circular holes 30 which are bounded by the perpendicular, outwardly extended semi-circular flanges 31. The flanges 29 and 31 form seats for clamping the connection fittings 39 in place, as more fully described hereinafter.

As shown in FIGS. 1 and 3, the side walls 19 and 20 of upper channel bar of the lower clamp section 10 are each provided with a plurality of similar semi-circular holes 32 along the lower end thereof, in spaced apart positions, and they are bounded by similar perpendicular, outwardly extended flanges 33. The side walls 22 and 23 of the lower channel bar of the lower clamp section 10 are each provided with a plurality of similar semi-circular holes 34 and perpendicular, outwardly extended flanges 35. In FIG. 1, the numerals 36, 37 and 38 indicate the center lines of the circular clamping holes or seats formed by the last described flanges and semi-circular holes in each of the tube clamp sections 10 and 11.

Figures 6, 7:
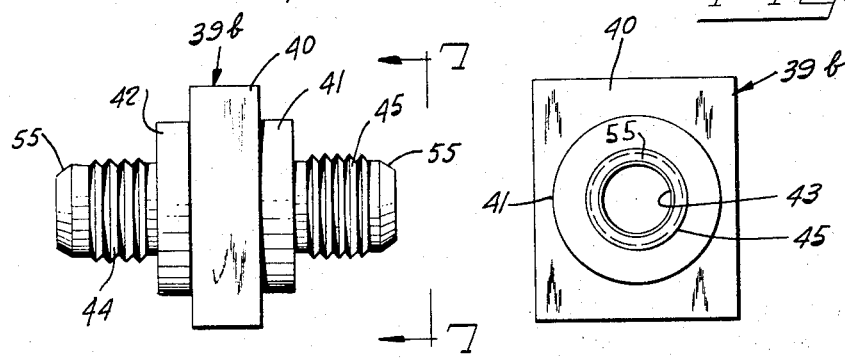
FIG. 6 is a side elevational view of a novel fitting employed in the clamp assembly of the present invention.
FIG. 7 is a side elevational view of the fitting structure illustrated in FIG. 6, taken along the line 7—7 thereof, and looking in the direction of the arrows.

As shown in FIGS. 6 and 7, the connection fittings or junction blocks 39 are adapted to connect together a pair of fluid lines in the forms of pipes, tubes or flexible tubing. Each of the connection fittings or junction blocks 39 comprises a substantially rectangular body 40 having spaced apart front and rear faces, side faces and top and bottom faces. Extended axially outward from the front and rear faces of the body 40, are a pair of axially aligned cylindrical shoulders or hubs 41 and 42. Integrally formed on the round shoulders 41 and 42, are a pair of axially aligned, outwardly extended integral threaded tubular shafts 44 and 45. A bore or passage 43 is formed through the junction block 39.

As shown in FIGS. 1 through 5, the connection fittings or junction blocks 39 are adapted to be seated in the clamp sections 10 and 11 in a sliding manner so as to vertically align the upper and lower channel bars of each clamp section. The flanges of the channel bars around the semi-circular holes, as for example, the flanges 29, 31, 33 and 35, are adapted to be seated on the rounded shoulders 41 and 42. It will be seen, that the blocks 39 co-act with the channel bars of the clamping section to quickly and easily align the fittings 39 into position in the horizontal, vertical and axial directions. The construction of the rectangular body 40 of each of the fittings 39 retains the fittings securely in place so that they will not rotate or turn in position, and they will not vibrate. Any suitable coupling means may be threaded on the threaded shafts 44 and 45 for connecting tubes, pipes or the like to the fittings.

The clamping sections 10 and 11 are adapted to be secured to each other and to a suitable supporting means by the studs 46 and the nuts 47. As best seen in FIG. 3, the studs 46 are adapted to pass through the holes 48, 49, 50 and 51 which are formed through the channel bar end walls 21, 18, 15 and 12, respectively.

FIG. 9 illustrates a connection fitting or junction block 39 which is constructed to connect a tube or pipe 52 to a hose 56. The tube 52 would be connected by a conventional coupling sleeve 53 and nut 54 to the threaded shaft 45 of a connection fitting 39. The tube 52 may have a flared end which is adapted to be seated on the conical outer end 55 of the threaded shaft 45 to be secured thereagainst in a seating relationship by the coupling sleeve 53 and the nut 54 in the usual manner. The flexible hose 56 is adapted to be secured to the other threaded shaft 44 by a suitable conventional detachable coupling indicated by the numerals 57 and 58.

It will be seen that the connection fittings 39 of the present invention have many advantages. For example, in many machine tool applications wherein a number of hydraulic tubes are employed, it is now possible with the applicant's clamp assembly and connection fittings to supply hydraulic fluid under pressure in a manner whereby the hydraulic feed lines may be quickly disconnected for shipping purposes. The clamp assembly also provides a convenient support means for the hydraulic tubes or fluid supply lines. It will also be seen that the connection fittings 39 may be provided with different size coupling means whereby the clamp assembly may support a plurality of different size tubes or fluid lines.

It will also be seen that the distances between the center lines of the holes 36, 37 and 38 are constant and that the holes in the stacked clamp sections are aligned vertically. The constant distances between the centers of the holes 36, 37 and 38 of the clamp sections make it easier for an operator to use the clamp sections because he does not have to work with odd dimensions. It will also be seen that the block shaped bodies 40 of the connection fittings 39 function also to space the elongated channel sections 14 and 17 in the vertical direction and to align the channel sections 14 and 17 in the transverse direction.

The clamp assembly of the present invention provides a clamping means whereby the user is prepared to connect a plurality of different size hydraulic lines together with a minimum number of shelf items since the connection fittings or junction blocks 39 are the same size, yet they may be made with different size members 44 and 45 for attachment to different size fluid lines. When it is desired to change one connection fitting 39 to permit a different size tube to be mounted in the clamp assembly, it is merely necessary to change that particular fitting 39 and insert one of another size without changing the rest of the clamp assembly. It will be seen that the cylindrical shoulders 41 and 42 also function with the flanges on the elongated sections 14 and 17 to locate the junction blocks or fittings 39 axially in the clamping assembly. The connection fitting body 40 permits a user to tighten a tube nut, as for example, the nut 54 on the fitting without the need of a wrench to hold the fitting since the rectangular body 40 is maintained in the elongated portions 14 and 17 in a position fixed against turning or rotation. It will be understood that the clamp means of the present invention may also be provided with rubber grommets for fixedly mounting in place a hydraulic line or tube as shown hereinafter.

FIGS. 10 through 16 illustrate a modification of the invention wherein the clamp assembly includes rubber grommets for mounting tubes in place, connection fittings 39 for connecting tubes together, and a novel stud means for securing the clamp assembly U-shaped members together. The parts of the clamp assembly in FIGS. 10 through 16 which are the same as the clamp assembly of FIGS. 1 through 9 have been marked with the same reference numerals.

Figure 10:
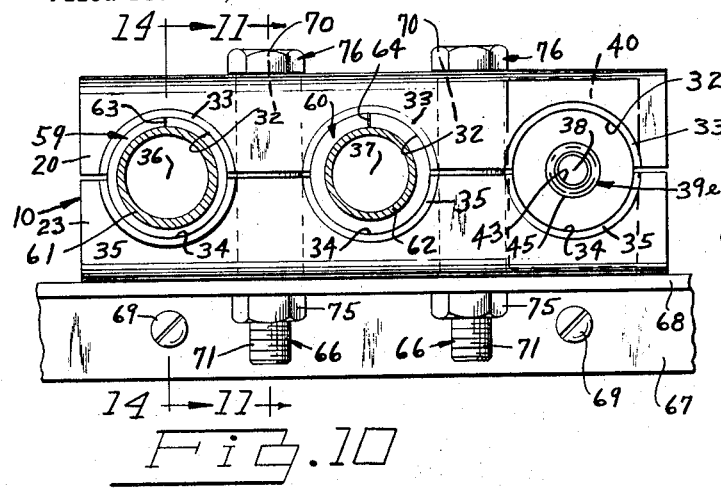
FIG. 10 is a side elevational view of a multiple clamp assembly made in accordance with the principles of the present invention, and showing the clamp assembly secured to a support member.
Figure 14:
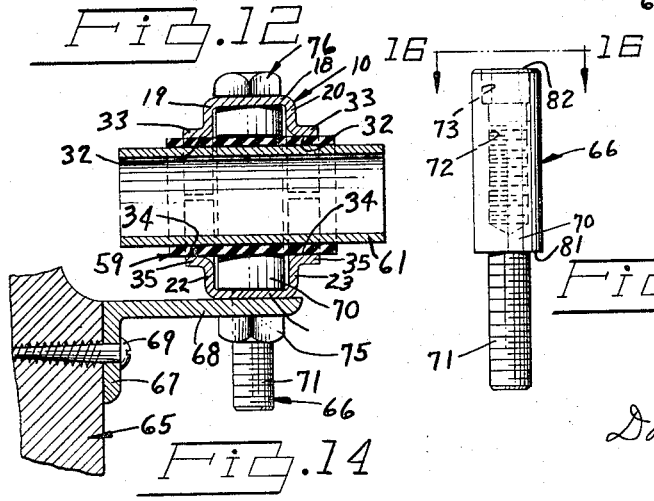
FIG. 14 is an elevational section view of the structure illustrated in FIG. 10, taken along the line 14—14 thereof, and looking in the direction of the arrows.
Figures 15, 16:
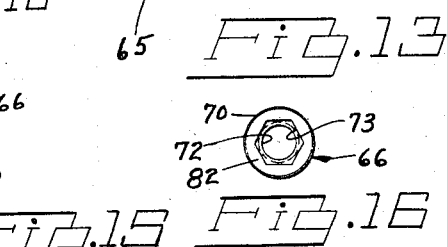
FIG. 15 is an elevational view of the novel stud structure employed in the clamp assembly of the present invention.
FIG. 16 is a top plan view of the stud structure illustrated in FIG. 15, taken along the line 16—16 thereof, and looking in the direction of the arrows.

As shown in FIGS. 10 and 14, a tubular grommet 59 is adapted to be mounted in one of the end transverse clamping seats formed by two of the semi-circular holes 32 and two of the holes 34. The central, similarly formed clamping seat retains in place the grommet indicated by the numeral 60. The grommets 59 and 60 are made from any suitable oil resistant resilient material, as for example, "neoprene" rubber or the like. The grommets assist in reducing vibration or shock to the tubes 61 and 62 that are held in the clamp assembly. The durometer rating of the grommets 59 and 60 should be sufficient to maintain the position of the tubes held within the clamp assembly and yet reduce vibration as much as possible. A preferable durometer number is 80.

As shown in FIG. 10, the tubular grommets 59 and 60 are each provided with a longitudinal split or slot as indicated by the numerals 63 and 64, respectively, to permit the grommets to be squeezed and to grip the tubes 61 and 62 in a firm and rigid clamping engagement. As shown in FIG. 10, the large internal surfaces of the flanges 33 and 35 provide a large surface area for engaging and squeezing the grommets 59 and 60 without cutting the grommets. It will be understood, that the grommets 59 and 60 may also be made of any suitable synthetic material. As shown in FIG. 10, the grommet 59 is provided with a first size hole, while the grommet 60 is provided with a slightly smaller hole therethrough for clamping therein the different size tubes 61 and 62, respectively.

It will be understood, that the clamping assembly may be employed to hold other tube assembly means in place, as for example, unions or couplings for connecting a pair of tubes together in the same manner as shown in FIGS. 1 through 9. The other end transverse clamping seat of the structure of FIG. 10 is shown holding in place a connecting fitting 39e in the same manner as the section 10 of FIGS. 1 through 9.

Figure 11:
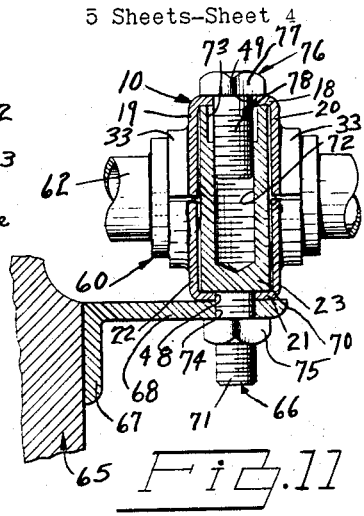
FIG. 11 is an elevational section view of the structure illustrated in FIG. 10, taken along the line 11—11 thereof, and looking in the direction of the arrows.

As shown in FIGS. 10, 11 and 14, the clamp section 10 is adapted to be secured to a support 65 by means of a suitable supporting bracket and a novel stud indicated by the numeral 66. The support bracket is illustrated in the form of an angle iron having a vertical leg 67 and an integral horizontal outwardly extended leg 68. The angle iron leg 67 is adapted to be secured to the support 65 by any suitable means, as by the screw 69. The stud 66 is provided with an elongated cylindrical body 70 and an integral threaded rod or shaft 71. The shaft 71 is formed on the lower end of the cylindrical body 70. An inwardly extended axially disposed hole 72 is formed in the body 70. The inner end of the hole 72 is threaded and the outer end thereof is enlarged as indicated by the numeral 73.

As shown in FIG. 11, the cylindrical body 70 is made to an outer diameter dimension adapted to provide a sliding fit between the outer surface of the cylindrical body 70 and the inside surface of the walls of the clamp section 10. The length of the cylindrical body 70 is also made to a predetermined dimension so that it will be seated in the clamping assembly and permit sufficient endwise clearance between the upper and lower sections so that they may be moved together to provide a clamping action on the grommets 59 and 60. It will be seen from FIG. 11 that the stud 66 functions to vertically align the upper and lower sections or channel bars of the clamping assembly in a quick and easy manner. The threaded shaft 71 is adapted to extend through the hole 48 formed in the lower channel wall 21 and thence through the hole 74 formed through the horizontal leg 68 of the angle iron supporting bracket. The stud shaft 71 is secured in place on the angle iron leg 68 by any suitable means, as by the nut 75. It will be seen, that the lower channel bar may be fixed in place on the angle iron bracket leg 68 before the upper channel bar is mounted in place. The grommets and tubes may then be quickly mounted in place and the upper channel bar disposed in place and aligned by the stud cylindrical body 70 and secured thereto by the bolts 76.

As best seen in FIG. 11, each bolt 76 has a head 77 and a threaded shaft 78 which is mounted through a hole 49 in the upper channel bar at each stud 66 for securing the upper channel bar to the studs 66. The upper channel bar may be quickly and easily dismantled from the lower channel bar of the clamp assembly by merely removing the bolts 76. The bolts 76 function to secure the two channel bars together and to provide the clamping pressure on the aforedescribed grommets to hold the tubes or pipes in place.

Figure 12:
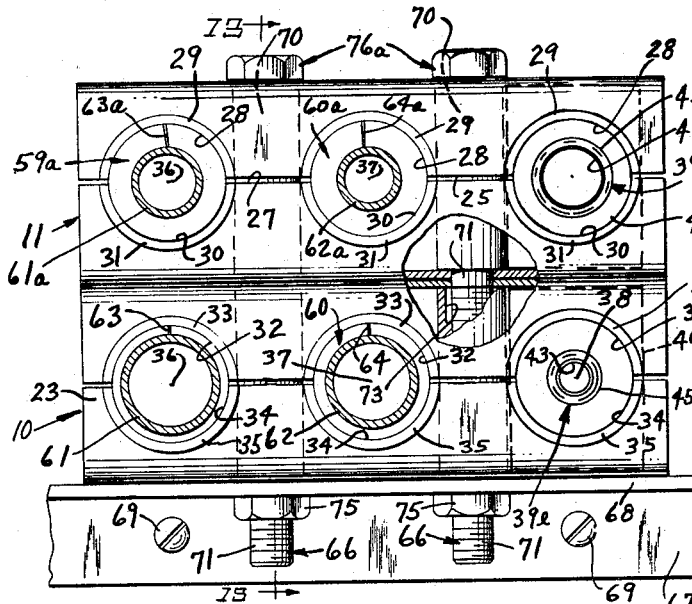
FIG. 12 is a side elevational view of a multiple clamp assembly made in accordance with the principles of the present invention and showing a plurality of clamp sections stacked in a vertical relationship.
Figure 13:
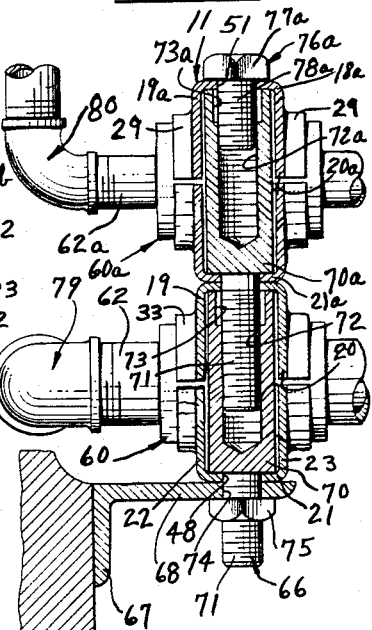
FIG. 13 is an elevational section view of the structure illustrated in FIG. 12, taken along the line 13—13 thereof, and looking in the direction of the arrows.

FIGS. 12 and 13 illustrate the clamping sections of FIG. 1 secured together by studs 66. The parts of the clamping sections of FIGS. 12 and 13 which are the same as the structure of FIG. 1 are marked with the same reference numerals. The embodiment of FIGS. 12 and 13 illustrates the manner in which a plurality of clamping sections 10 and 11 may be stacked, one on top of the other, in a quick and easy manner by the employment of a plurality of the studs 66. The first or lower clamping section 10 is constructed in the same manner as the clamping section 10 illustrated in FIGS. 10, 11 and 14, and it is secured to the support 65 in the same manner. The second or upper clamping section 11 is provided with grommets 59a and 60a and it is easily mounted on top of the lower clamping section 10 by merely removing the bolt 76 and threading the upper studs 66a in the threaded holes 72 of the lower studs 66. The upper channel bar of the section 11 is then secured in place by means of the bolts 76a. The numerals 79 and 80 merely illustrate the pipes or tubes which are connected to the tubes 62 and 62a supported by the clamping assembly embodiment of FIGS. 12 and 13.

It will be seen, that the novel studs 66 function to maintain the relative positions of the two sections of a clamp assembly and to locate the bottom section when the clamp assembly is being mounted in place. The bottom end 81 of the stud body 70 engages the bottom wall of the lower channel bar and the top end 82 of the stud body 70 is adapted to engage the top wall of the upper channel bar so as to limit the movement of the upper channel bar toward the lower channel bar and space the channel bar apart. The studs 66 aid in assembling the top section of each clamp assembly onto the bottom section, and they aid in the stacking of a number of clamp assemblies one on top of another.

FIGS. 17 through 22 illustrate a mounting means which may be employed for mounting a clamp assembly on a supporting bracket or a machine base. FIGS. 17, 18 and 19 illustrate a clamp assembly 10 which is made in the same manner as the clamp assembly shown in FIG. 1, and the parts thereof have been marked with the same reference numerals as used in FIG. 1. The clamp assembly of FIGS. 17, 18 and 19 includes four seats or positions in which are contained a grommet 59, a connection fitting 39d, and a pair of clamp mounting members 83.

As best seen in FIGS. 20, 21 and 22, the clamp mounting adaptors 83 each comprise a cylindrical body 84 and a pair of axially extended cylindrical shoulders 85, which are of a reduced diameter as compared to the body 84. The ends of the body 84 form shoulders 86, which are adapted to engage the inner faces of the sidewalls of the upper and lower channel numbers in a clamp assembly so as to position the channel members transversely relative to each other.

As shown in FIGS. 18 and 19, the clamp mounting adaptors 83 are adapted to be each seated in a pair of transversely disposed holes formed in the channel members by the semi-circular holes along the free edges of the channel bar walls. The shoulders 85 are engaged by the outward extended flanges 33 and 35 which also limit the movement of the upper channel bar relative to the lower channel bar in the clamp assembly. Each of the clamp mounting adaptors 83 is provided with an axial bore 87. A mounting bolt 88 is extended through the bore 87. The bolt 88 is adapted to extend through a hole 89 in the vertical leg 90 of an angle iron mounting bracket and secured in place by the nut 95. The other leg 91 of the angle iron mounting bracket is illustrated as being secured to a mounting plate 92, or the like, by the bolt 93 and the nut 94. It will be understood that the clamp mounting adaptors 83 and the bolt 88 may be used to attach a clamp assembly to any desired mounting bracket or directly on a machine tool.

In the claims, the term clamp fixture is used to designate either a grommet 59, a tube connection fitting or tube junction 39, or a clamp mounting adapter 83.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a tube clamp assembly, the combination, comprising:
    (a) an upper, inverted U-shaped channel bar disposed in vertical alignment with a lower U-shaped channel bar to form an elongated rectangular tubular member;
    (b) each of said U-shaped channel bars having a pair of spaced apart side walls;
    (c) each of said side walls of each U-shaped channel bar being provided with a plurality of longitudinally spaced apart, semi-circular holes along the free edges thereof;
    (d) the semi-circular holes in the one U-shaped channel bar being vertically aligned with the semi-circular holes in the other U-shaped channel bar to form a plurality of pairs of transversely spaced apart circular holes;
    (e) a clamp fixture seated in the U-shaped channel bars at each pair of aligned transversely spaced apart circular holes;
    (f) means for locating the upper, inverted U-shaped channel bar on the lower channel bar; and,
    (g) means for securing the upper, inverted U-shaped channel bar to the lower U-shaped channel bar.

2. The tube clamp assembly as defined in claim 1, wherein:
    (a) the semi-circular holes in the U-shaped elongated members are evenly spaced apart from each other.

3. The tube clamp assembly as defined in claim 1, including:
    (a) at least another pair of upper and lower U-shaped channel bars mounted on said first named channel bars; and,
    (b) means for securing the second named channel bars to the first named channel bars in a vertically aligned, stacked arrangement.

4. The clamp assembly as defined in claim 1, wherein:
    (a) said clamp fixture is a grommet comprising a sleeve made from tubular resilient material.

5. In a tube clamp assembly, the combination, comprising:
    (a) an upper, inverted U-shaped channel bar disposed in vertical alignment with a lower U-shaped channel bar to form an elongated rectangular tubular member;
    (b) each of said U-shaped channel bars having a pair of spaced apart side walls;
    (c) each of said side walls of each U-shaped channel bar being provided with a plurality of longitudinally spaced apart, semi-circular holes along the free edges thereof;
    (d) the semi-circular holes in the one U-shaped channel bar being vertically aligned with the semi-circular holes in the other U-shaped channel bar to form a plurality of pairs of transversely spaced apart circular holes;
    (e) a clamp fixture seated in the U-shaped channel bars at each pair of aligned transversely spaced apart circular holes;
    (f) means for locating the upper, inverted U-shaped channel bar on the lower channel bar;
    (g) means for securing the upper, inverted U-shaped channel bar to the lower U-shaped channel bar; and,
    (h) said clamp fixture comprising a tube connection fitting provided with an axially extended cylindrical shoulder on each end thereof, said shoulders being seated in a pair of said transversely spaced circular holes and engaged by the sidewalls of the U-shaped channel members and each shoulder having an extension with means for connecting it to a tube.

6. The tube clamp assembly as defined in claim 5, wherein:
    (a) said means for locating the upper U-shaped channel bar on the lower U-shaped channel bar comprises a body member on the clamp fixture that extends into the U-shaped channel bars and slidably engages the inner sides of the wall of said channel bars.

7. In a tube clamp assembly, the combination, comprising:
    (a) an upper, inverted U-shaped channel bar disposed in vertical alignment with a lower U-shaped channel bar to form an elongated rectangular tubular member;
    (b) each of said U-shaped channel bars having a pair of spaced apart side walls;
    (c) each of said side walls of each U-shaped channel bar being provided with a plurality of longitudinally spaced apart, semi-circular holes along the free edges thereof;
    (d) the semi-circular holes in the one U-shaped channel bar being vertically aligned with the semi-circular holes in the other U-shaped channel bar to form a plurality of pairs of transversely spaced apart circular holes;
(e) a clamp fixture seated in the U-shaped channel bars at each pair of aligned transversely spaced apart circular holes;
(f) means for locating the upper, inverted U-shaped channel bar on the lower channel bar;
(g) means for securing the upper, inverted U-shaped channel bar to the lower U-shaped channel bar;
(h) said clamp fixture comprising a mounting adaptor provided with an axially extended cylindrical shoulder on each end thereof;
(i) said shoulders being seated in a pair of said transversely spaced circular holes and engaged by the sidewalls of the U-shaped channel members; and,
(j) an axial bore formed through the adaptor for the reception of a mounting bolt for securing the clamp assembly in place.

8. In a tube clamp assembly, the combination, comprising:
(a) an upper, inverted U-shaped channel bar disposed in vertical alignment with a lower U-shaped channel bar to form an elongated rectangular tubular member;
(b) each of said U-shaped channel bars having a pair of spaced apart side walls;
(c) each of said side walls of each U-shaped channel bar being provided with a plurality of longitudinally spaced apart, semi-circular holes along the free edges thereof;
(d) the semi-circular holes in the one U-shaped channel bar being vertically aligned with the semi-circular holes in the other U-shaped channel bar to form a plurality of pairs of transversely spaced apart circular holes;
(e) a clamp fixture seated in the U-shaped channel bars at each pair of aligned transversely spaced apart circular holes;
(f) means for locating the upper, inverted U-shaped channel bar on the lower channel bar;
(g) means for securing the upper, inverted U-shaped channel bar to the lower U-shaped channel bar;
(h) said means for securing the upper U-shaped channel bar to the lower U-shaped channel bar comprising at least one stud having an elongated body disposed in said channel bars and a threaded shaft on the lower end of the body and extended out of the lower channel bar for securing the clamp assembly in place; and,
(i) said elongated stud body being provided with an axial threaded bore on the upper end for the reception of a threaded member for securing the upper channel bar on said lower channel bar.

9. The tube clamp assembly as defined in claim 8, wherein:
(a) said means for locating the upper, inverted channel bar on the lower U-shaped channel bar comprises the elongated body on said stud which is formed to a length having the bottom end engaging the bottom wall of the lower channel bar and the top end adapted to engage the top wall of the upper channel bar so as to limit the movement of the upper channel bar toward the lower channel bar.

References Cited

UNITED STATES PATENTS

| | | | |
|---|---|---|---|
| 826,916 | 7/1906 | Bartley | 174—155 |
| 1,133,976 | 3/1915 | Kraus | 248—68 |
| 2,227,528 | 1/1941 | Adler | 174—135 |
| 2,231,462 | 2/1941 | Cobb | 248—68 X |
| 2,425,935 | 8/1947 | Hayman | 248—68 X |

CHANCELLOR E. HARRIS, *Primary Examiner.*